Feb. 24, 1959  G. W. HOLMAN ET AL  2,875,066
RAPID DIRECTED INTERESTERIFICATION OF GLYCERIDES
Filed July 15, 1954  3 Sheets-Sheet 1

INVENTORS.
GEORGE W. HOLMAN
AND LOUIS H. GOING,
BY
Allen & Allen
ATTORNEYS.

Feb. 24, 1959  G. W. HOLMAN ET AL  2,875,066
RAPID DIRECTED INTERESTERIFICATION OF GLYCERIDES
Filed July 15, 1954  3 Sheets-Sheet 2

INVENTORS.
GEORGE W. HOLMAN
AND LOUIS H. GOING.
BY
Allen & Allen
ATTORNEYS.

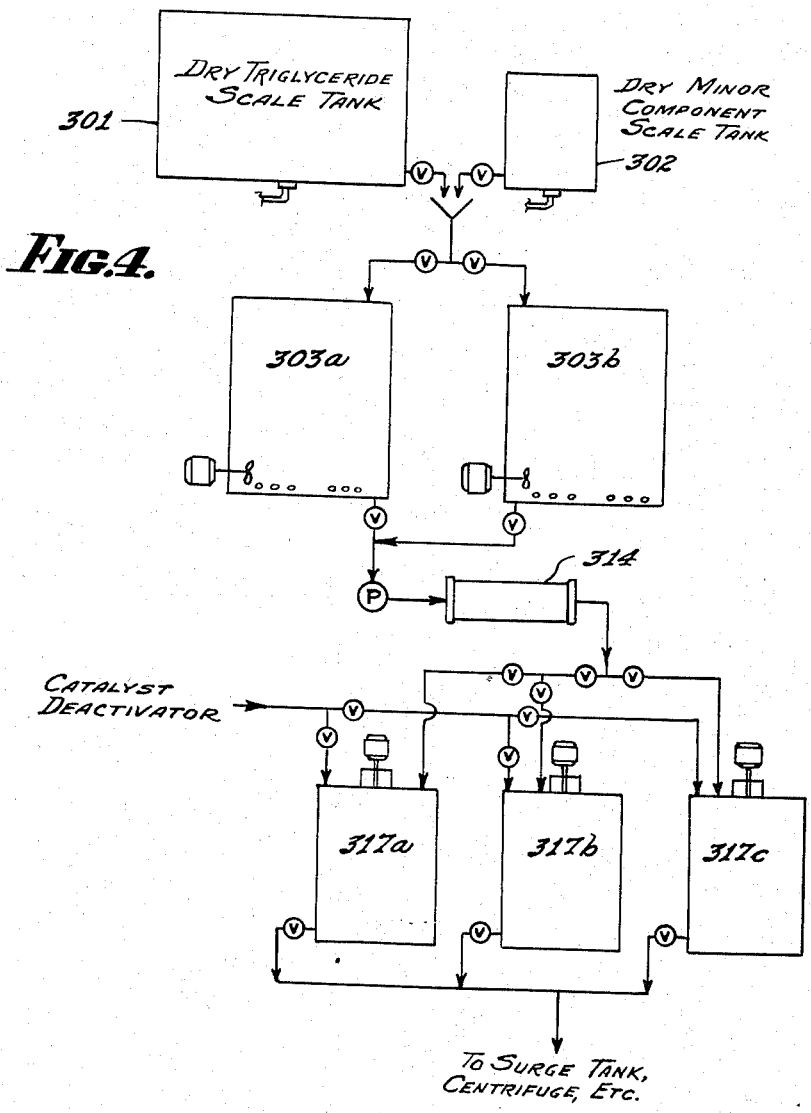

2,875,066

RAPID DIRECTED INTERESTERIFICATION OF GLYCERIDES

George W. Holman, Wyoming, and Louis H. Going, Loveland, Ohio, assignors to The Procter & Gamble Company, Cincinnati, Ohio, a corporation of Ohio Application July 15, 1954, Serial No. 443,655

9 Claims. (Cl. 99—122)

This invention relates to improvements in processes for the directed interesterification of glyceride oils and fats. U. S. Patents 2,442,531 to 2,442,539 inclusive set forth the basic principles of "directed rearrangement," by which we mean low temperature interesterification of glycerides (in which two or more different species of fatty acid radicals are present) with simultaneous crystallization of one desired type of glyceride resulting from the interesterification. These patents also set forth numerous useful applications of these principles, describe several modifications of processes employing these principles, and relate these to new or modified products which may be made by such processes. The present invention deals with certain improvements in the general process of directed rearrangement of glycerides, whereby the formation of directedly rearranged glyceride products may be greatly accelerated, and in preferred cases may be accomplished in a continuous manner.

Principal objects of the invention are to provide rapid, economical, and readily controlled methods for processing glyceride fats, especially for the manufacture of edible fat products, employing directed rearrangement. Specific objects are to provide methods of speeding up the directed rearrangement of glycerides, to make the process either partially or fully continuous, and to control the end point so as to obtain superior products.

Figure 1:
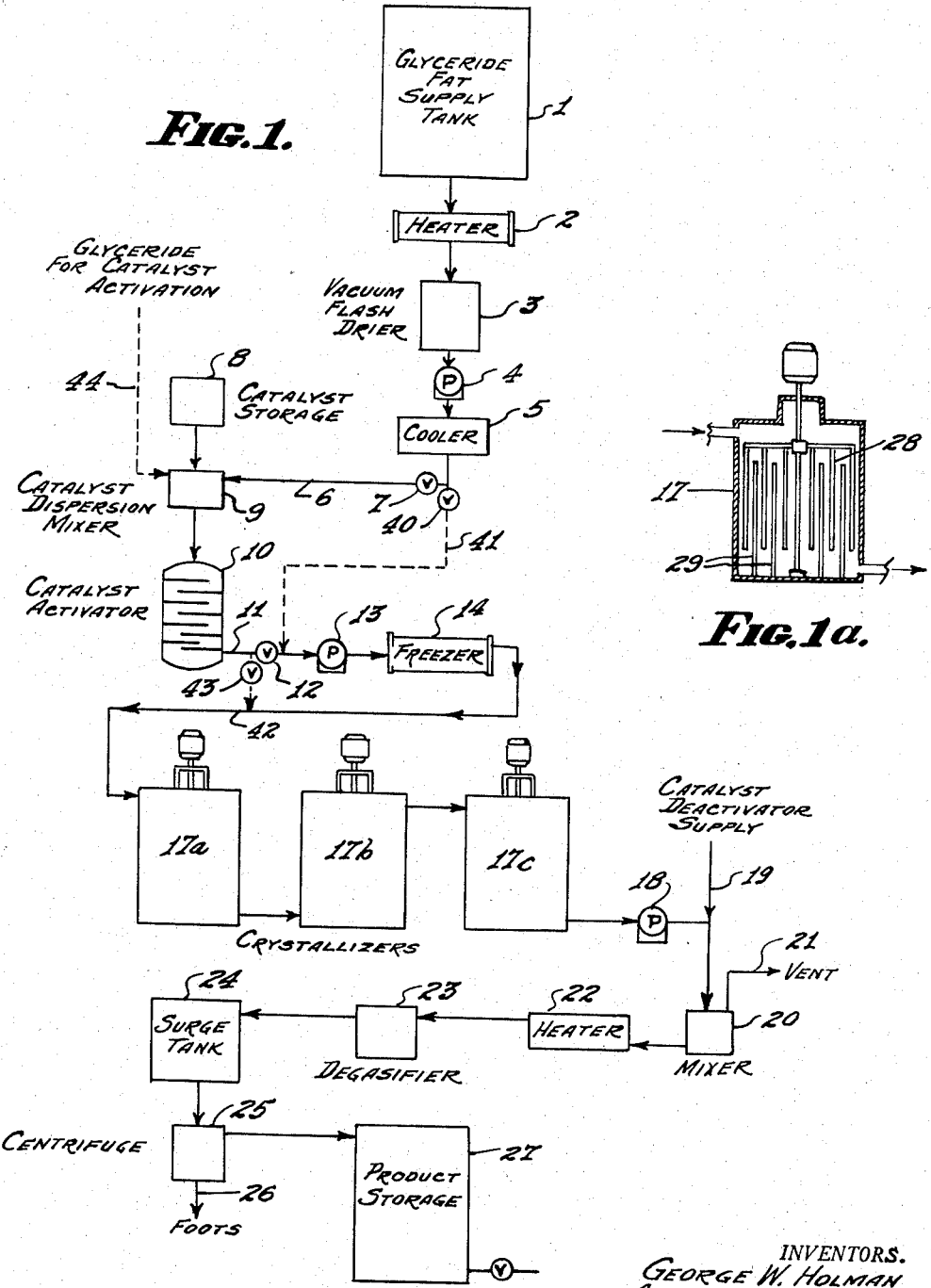
Figure 2:
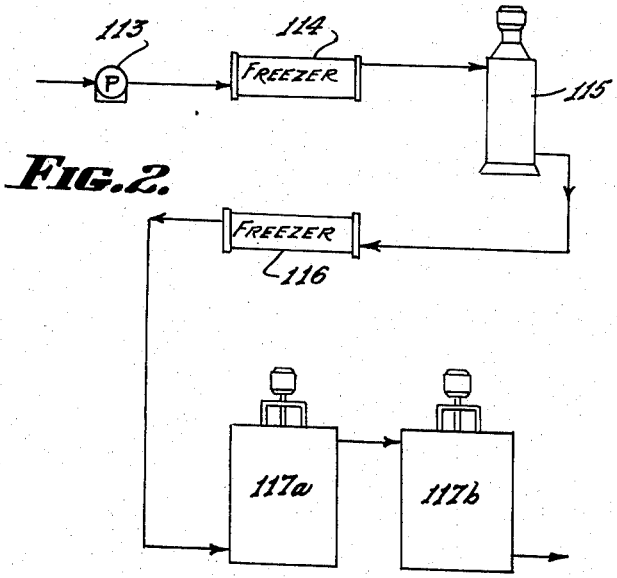
Figure 2A:
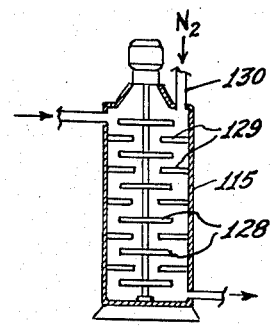
Figure 3:
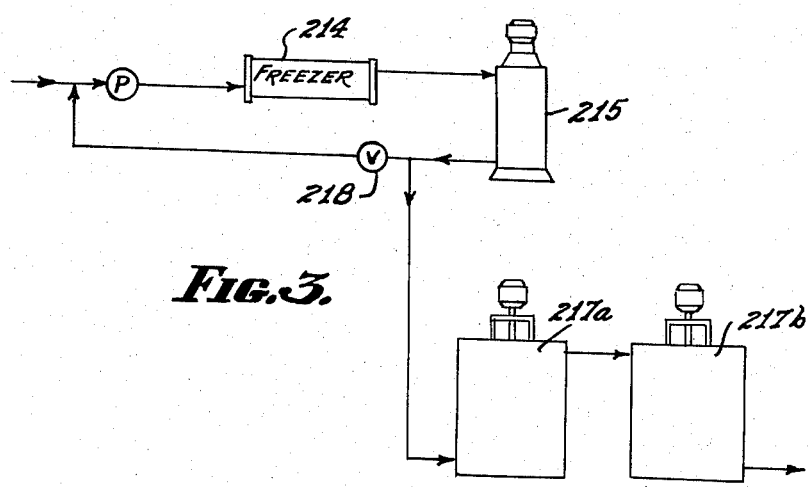

In the accompanying drawings, Figures 1, 2, and 3 are schematic flow charts of different modes of carrying out our process continuously, Figures 1a and 2a being schematic vertical sectional views of designated crystallizers, and Figure 4 illustrates a semi-continuous process.

Our process has wide applicability in the processing of triglyceride fats for shortening manufacture and for the manufacture of other edible fats such as margarine and confectioner's hard butter, whenever it is desired to increase the content of one type of triglyceride having a comparatively high melting point and containing at least two saturated fatty acid radicals, at the expense of a lowering of the saturated fatty acid radical content of other triglyceride species of the original fat. Usually it is the trisaturated glyceride content which one desires to increase; but sometimes it is desired to increase the content of a disaturated monounsaturated triglyceride, in which case seeding may be practiced; and in still other cases the content of solid forms of mono- and/or diglycerides may be increased.

U. S. Patents 2,442,531, -532, and -534 to -539 describe many applications of the directed interesterification process in the manufacture of edible glyceride fat products, and in such applications our improved process can advantageously be employed. As raw materials one may use, to name but a few, vegetable oils such as cottonseed, soybean, sesame, corn, sunflower, linseed, peanut, palm, palm kernel, and coconut, and animal fats such as tallow and lard, and marine oils such as whale, menhaden, and sardine, frequently after a preliminary partial hydrogenation, and blends of any of the foregoing (or other) oils and fats and partially or fully hydrogenated oils. Specially prepared glycerides such as mono- and diglycerides, acetin-containing triglycerides, and fully hydrogenated hard stock, may be included if desired.

We have discovered that mixed glyceride fats can quickly and economically be processed to produce superior directedly rearranged products in a continuous manner, if certain processing steps and controls are practiced. For convenience we shall describe the process as applied to the treatment of edible triglyceride fats in the manufacture of plastic shortening.

Our preferred process comprises passing a continuous stream of dried melted triglyceride fat, in which two or more different species of fatty acid radicals are present, through a rapid chilling operation in admixture with a low temperature interesterification catalyst, the temperature being lowered sufficiently to cause trisaturated glycerides to crystallize out of solution, and the manner of chilling, desirably with intense agitation, being such that a cloud of extremely minute crystals forms. Thereupon we continue to move the stream along, preferably at greatly reduced velocity, while effecting progressive interesterification of the glycerides in the liquid phase and simultaneous crystallization of newly formed trisaturates, at progressively rising temperatures. During this stage of the process the stream is agitated to prevent solidification of the thixotropic mass as its crystalline solids content increases and to facilitate continued crystallization of newly formed trisaturates. Precautions preferably are taken to minimize end-for-end mixing, i. e. contamination of intermediate or later portions of the progressively changing mass with less changed material from earlier portions. Finally, when the total trisaturate content of the most advanced portion of the stream has reached a predetermined desired value (which in all cases is short of the equilibrium trisaturate content attainable by prolonging the process either at the then prevailing temperature or under adiabatic conditions) the catalyst is inactivated, the mass is heated until fully melted, the soap foots and other extraneous materials resulting from the catalyst deactivation are removed, and other processing steps normal and desirable in the manufacture of plastic shortening are carried out. These other steps may include refining, bleaching, partial hydrogenation, blending, deodorizing, plasticizing, tempering, and packing.

We find it desirable, in some circumstances, to employ two or more cycles of the above described sequence of quick continuous cooling followed by slower continuous directed rearrangement. In that event the first chilling is not as extreme as it is when but one cycle is to be employed, and similarly the first directed rearrangement stage is shorter, this step being interrupted part way by the second stage of rapid chilling (see Figure 2). In our preferred practice, in treating fats for the manufacture of plastic shortenings, the total time of rapid chilling, whether carried out in one or more stages, need take no more than a minute or less, and the total desired amount of directed rearrangement with slowly rising temperature can be and normally is accomplished in about one to two hours. In all cases the total time of forced cooling is preferably no more than about $\frac{1}{20}$ the total time of directed rearrangement.

Another variation that is sometimes advantageous in carrying out our process comprises a partial two cycle operation, employing but one rapid chilling "freezer." In this practice the second chilling step is accomplished by recycling part of the stream from the first cycle through the main-stream first-step "freezer" (see Figure 3, in which variable control valve 218 controls the size of the fraction which is recycled). This has some advantage in economy of equipment over a full two-cycle practice. We use the term "freezer" to denote a scraped-wall chilling device such as a "Votator" (U. S. Patent 1,783,864 and others).

A rapid and satisfactory semi-continuous variation of our process employs the same continuous quick chilling step, as has been described, followed by a batchwise crystallizing step (Figure 4), as will be further explained.

A quick means of obtaining a rough measure of the extent of directed rearrangement is the "cloud point" test. When lard, for example, is randomly rearranged (i. e. interesterified while wholly in liquid condition) its cloud point usually rises about 2° to 5° C., and when either the crude lard or the randomly rearranged lard is subjected to directed rearrangement its cloud point increases rapidly. An increase of at least 3° or 4° C. over the cloud point of the randomly rearranged material, and an overall increase of about 6° to 16° C. over the cloud point of the crude lard is desirable in making plastic lard shortening. Briefly, we determine the cloud point of a melted sample by placing it in a tall form electrolytic type beaker (Corning #1140) equipped with a stirring device and a centigrade thermometer, flowing a stream of water at 0° to 7° C. over the outside of the beaker at such a rate that the temperature of the glyceride mixture drops from 60° C. to 40° C. in about one minute, passing a beam of white light through the beaker and sample, the transmitted beam intensity being such that a photocell registers 200 microamperes while the sample is wholly liquid, and noting the temperature at which the transmitted beam intensity is reduced to 31.4% of its initial intensity as a result of crystal formation throughout the sample.

A more accurate measure of the extent of directed rearrangement, although not as quick as the cloud point test, is the determination some one temperatureee, or better at several temperatures, of the solids content index (S. C. I.) as described in 31 J. A. O. C. S. 98–103 (March 1954). This test gives an accurately reproducible approximation of the percentage by weight of solids in a sample of the product at the selected temperature, as determined dilatometrically on the reasonable assumption that the fat solids are just 10% more dense than the liquid oil.

The following examples are illustrative of several modifications of our process. The process has been found to be particularly useful in the manufacture of lard shortening (including blends of lard and other edible fat or oil) and for this reason most of the examples deal with this particular application of the process.

*Example 1.*—Referring to Figure 1, melted prime steam lard containing 0.13% of moisture, is fed at a rate of 100 parts by weight per hour from storage tank 1, through heater 2 where its temperature is raised to about 330° F., into vacuum flash drier 3 (a chamber maintained under reduced pressure, into which the heated oil is admitted in attenuated form, e. g. as a spray, so as to provide a large surface area for the escape of vaporized water) in which its moisture content is reduced below 0.01%. The dried lard is then transferred by pump 4 to tubular cooler 5 (e. g. a conventional tubular heat exchanger) which reduces its temperature to about 100° F.; thence it passes through pipe 6 to the catalyst dispersion mixer 9, valve 7 being open and valve 40 closed. A dispersion of metallic sodium in an equal weight of toluene is fed from catalyst storage tank 8 at a rate of 0.34 part per hour into mixer 9, this being equipped with a high speed mechanical agitator capable of creating a uniform dispersion of the sodium particles (which preferably are of about 5 to 20 micron size in the toluene dispersion) throughout the whole body of melted, or nearly melted, dry lard.

The lard-sodium dispersion is retained for several minutes in tank 10 to allow time for activation of the catalyst. This catalyst activation is not well understood, and it is assumed that the metallic sodium is not the true catalyst, but that it reacts with fatty matter to form a reaction product which is the true interesterification catalyst. For a brief induction period after the sodium-toluene dispersion is mixed with the liquid lard the cloud point of the lard remains unchanged, but within a very few minutes it begins to change rather rapidly, indicating that active catalyst has formed and interestification has begun. This test may be made upon samples of the lard withdrawn from different parts of tank 10 and instantly subjected to catalyst deactivation and removal, the cloud point of the purified sample then being determined by the method previously described.

The lard-catalyst dispersion is then drawn through pipe line 11 by pump 13 (valve 12 being open and valve 43 being closed) and passed through the scraped-wall freezer 14 which reduces its temperature to 70° F. so rapidly that there is an initial supercooling that is quickly followed by the formation of a heavy cloud of minute solid fat crystals throughout the flowing mass.

The chilled triglyceride mixture then passes slowly through one or more of the series of crystallizers represented at 17a, 17b, 17c, etc. Each of these is equipped with a mechanical agitator, which may be in the form of a slowly revolving rake 28, mounted on a vertical shaft as shown in Fig. 1a, stationary vertical hold-back blades 29 being mounted on the floor of the tank so as to be positioned between the moving rake teeth. (Alternatively, one or more crystallizers of the type shown in Fig. 2a may be used.) Each crystallizer can conveniently be provided with heating means, mainly for emergency use in case its contents become too stiff to pump.

While in the crystallizers interesterification occurs throughout the liquid fraction of the glyceride mixture, and as this tends to produce a random distribution of the different species of fatty acid radicals upon the glycerin radicals of this liquid fraction it results in the creation of new trisaturates to replace those which have precipitated out of solution as solid fat crystals. The temperature of the mass is, however, too low to permit all of these newly formed trisaturates to remain in solution in the liquid fraction, and they therefore crystallize, thus prolonging the deficiency of trisaturates dissolved in the random-tending liquid fraction. The temperature of the slowly moving body of glycerides gradually increases, due to the heat of crystallization which is liberated (and due also to some mechanically generated heat from the agitation), and as the ratio of its solid fraction to its liquid fraction increases it acquires a thixotropic character, requiring constant agitation to prevent solidification. The progressive interesterification of the liquid fraction, and increase of the solid fraction due to further formation and crystallization of trisaturates, can continue until the temperature has reached the point at which the chemical equilibrium of the interesterification reactions in the liquid fraction is in balance with the physical equilibrium between the solid phase and the saturated solution of trisaturates. For practical reasons, however, we find it desirable to interrupt this directed rearrangement step of our process long before it has reached an equilibrium balance. If trisaturate formation is plotted on a vertical scale and time on a horizontal scale, we find that in our process the trisaturate content rises steeply at first but almost levels off as the ultimate equilibrium balance is approached. If the directed rearrangement is interrupted during the steep part of the rise accurate control of the desired end point is very difficult (and there is also a wasteful use of refrigeration); whereas if the directed rearrangement is continued until the curve becomes nearly horizontal excessively large and costly crystallizer capacity is required. We therefore find it decidedly preferable to terminate the directed rearrangement step after the initial steep rise in the trisaturates curve, but before the rate of trisaturate formation becomes unduly slow.

In this particular Example 1, we adjust the dwell time of the triglyceride mixture in the crystallizer (or in the battery of crystallizers if several are used) to be just 60 minutes, this being accomplished by suitable adjustment of the level of the mass in the last of the series of crystallizer units, as controlled by the delivery rate of pump 18. The temperature of the processed lard leaving the crystallizer at the end of its 60 minutes of directed rearrangement is 92° F.

On the way to mixer 20 there is added to the stream of semi-solid glycerides from the last crystallizer 2.07 parts per hour of water, from pipe line 19, this being an amount of water found suitable to hydrolyze or decompose the sodium-containing active catalyst, react with any residual sodium, form a caustic lye capable of refining the processed lard, and forming soap foots capable of easy removal by centrifuging.

The aqueous catalyst deactivating agent (in this case water) is thoroughly mixed throughout the directedly interesterified lard in mixer 20 while the temperature rises to 103° F.; the mixture is then quickly passed through the heater 22, which melts the solid trisaturate fraction; and then through degasifier 23 into the temporary storage tank, or surge tank 24. Hydrogen is generated in small amount as a result of reaction of the sodium, and it is removed in part through vent 21, and in part by means of degasifier 23 which is maintained under reduced pressure.

From surge tank 24, which may be equipped with an agitator to facilitate the coagulation of soap foots, the refined processed lard is passed through centrifuge 25 (from which foots are removed at 26) and thence to storage tank 27. (Surge tank 24 may be by-passed if desired.) After this the processed lard is deodorized, plasticized, and packed.

The directed rearrangement in this case raises the cloud point of the lard from an initial value of 22.9° C. to a final value of 31.8° C. Plasticized shortening thus made has a good consistency at room temperature, a wide plastic range, retains a good appearance and good plastic behavior through a prolonged period of storage, and performs exceedingly well as a shortennig in making all manner of baked goods.

*Example 2.*—Instead of activating the catalyst after adding the sodium to the main stream of lard to be directedly rearranged, it may be preactivated before it is added to the main stream; also the point of addition of the preactivated catalyst may if desired be just beyond the freezer instead of ahead of the freezer, although this is not our preferred practice. When employing these two modifications of our process, the flow is as indicated in the dotted lines of Figure 1, valves 7 and 12 being closed, valves 40 and 43 being open. A suitable supply of glycerides, which may be but need not be lard, usually not more than about 15% of the lard to be processed, is delivered to catalyst dispersion mixer vessel 9 from pipe line 44. After catalyst activation the glyceride-catalyst dispersion is fed through line 42 to the main stream of chilled lard coming from freezer 14 (it could of course be added ahead of the freezer by opening valve 12 and closing 43).

*Example 2a.*—In a variation of Example 2, 0.23% of sodium-potassium alloy catalyst in liquid metallic form is introduced and dispersed throughout a flowing stream of lard which has previously been chilled in a continuous freezer to 73° F., and in which a cloud of solid fat crystals is present before the catalyst is added. After a total of seven minutes time of agitation at temperatures ranging up to 82° F., cloud point tests and S. C. I. tests indicate that no interesterification of the lard has occurred, signifying that the catalyst is still not activated. After 90 minutes' time of passage through a crystallizer, however, the temperature has increased to 94° F., the cloud point of the lard is found to have increased from 17.3° C. to 30.6° C. (the same lard when randomly rearranged to equilibrium shows a cloud point of 23.3° C.), and the S. C. I. at 92° F. is found to have increased from 2.9 to 14.8 (at 92° F. the S. C. I. of the randomized lard is 4.8).

In this example the initial cloud of crystals formed upon passage through the freezer is composed largely of disaturated monounsaturated glycerides, but these redissolve and their place is taken by trisaturate crystals as the directed rearrangement proceeds.

The S. C. I. of the directedly rearranged product is 18.2 at 70° F. and 14.8 at 92° F. After suitable refining the material is suitable either with or without slight hydrogenation for use as plastic shortening.

*Example 3.*—Referring now to Figure 2, which illustrates those portions of a two-cycle directed rearrangement process which differ from Figure 1, a melted blend of 90% prime steam lard and 10% edible beef tallow is dried and cooled to 113° F., and to a flowing stream of this glyceride mixture there is continuously added 0.24% of a liquid 50-50 mixture of sodium and potassium, which is finely dispersed throughout the body of melted fat. After allowing ample time for catalyst activation the fat-catalyst dispersion is fed by pump 113 continuously through the first freezer 114, from which it issues at a temperature of 82° F.

Crystallization and continuing interesterification then continue while the mixture passes through the preliminary crystallizer 115. This requires about two minutes, during which time the temperature rises to 87° F. This crystallizer, which may be constructed as shown schematically in Figure 2a, is equipped with agitator blades 128, turning at about 120 R. P. M., hold-back arms 129, and a nitrogen inlet 130. (The use of an inert gas blanket is recommended in all vessels containing alkali metals which are not kept filled with the liquid fat.)

From preliminary crystallizer 115 the thixotropic mass flows to the second freezer 116 which cools it to 80° F. Thence it passes through crystallizers 117a and 117b, and after a total dwell time of 75 minutes in these two vessels it emerges at a temperature of 90° F. Before further rise in temperature occurs the catalyst in it is inactivated, the fat is melted, and the foots are removed, all as described in Example 1.

This processing raises the cloud point from 23.2° C., for the initial blend, to 31.7° C. after catalyst removal.

The directedly rearranged lard blend is then hydrogenated to the extent of a 1.9 decrease in its iodine value. After steam-vacuum deodorization it is plasticized by rapidly chilling to induce copious crystal formation, picking (i. e. agitating to inhibit crystal interlocking) until the temperature rises to about 78° to 80° F., and packing.

*Example 4.*—In a procedure generally similar to Example 1, except (a) that 0.4% of sodium methylate is used as a catalyst instead of metallic sodium, and (b) that the lard-catalyst mixture is randomly rearranged at 140°–160° F. before entering the freezer 14, the lard is rapidly chilled to 74° F., directed rearrangement is continued for one hour while the temperature rises to 83° F., the catalyst is inactivated by the incorporation of 1.7% of water, the fat is melted, and the soap foots are removed. This treatment increases the cloud point of the lard from 20.0° to 32.2° C.

This directedly rearranged lard is hydrogenated at 330° F., at a hydrogen pressure only slightly above atmospheric, to an iodine value drop of 9.1 units. The Solids Content Index of the resulting product at 70° F. is 22.5, which is too high for optimum consistency for a household shortening. This is corrected by adding 15% by weight of lard which has been randomly rearranged and hydrogenated to an I. V. drop of about 3 to 4 units, and also adding (towards the end of deodorization) 4.5% by weight of a mixture of mono-, di-, and triglycerides (the proportions of these being about 40:40:20) of partially hydrogenated (about 78 I. V.) cottonseed oil.

*Example 5.*—In this example 87.5% by weight of lard is blended with 12.5% of soybean oil which had been substantially completely hydrogenated to an I. V. of 8 units. The blend was first randomized, using 0.2% of sodium methoxide as catalyst. It was then continuously and rapidly chilled in a scraped wall freezer to 75° F., directedly rearranged with constant agitation for 60 minutes, during which time its temperature rose to 86° F.; the catalyst in it was then inactivated and removed.

The cloud point of the randomized blend was 29.1° C. and that of the directedly rearranged product was 34.1° C. The consistency after plasticizing was suitable for commercial shortening use.

Examples of other mixtures of triglycerides appropriate for treatment according to any of the foregoing general methods of carrying out our process are, to name but a few: lard-palm oil blends, palm oil-peanut oil blends, lard-cottonseed oil blends, marine oil hydrogenated to 70–100 iodine value, blends of tallow and any of the temperate zone seed oils such as cottonseed, soybean, peanut, corn, sunflower, and three-component blends of lard, tallow or palm oil, and any of the aforementioned seed oils. The directedly rearranged products made from such glyceride-mixtures may be partially hydrogenated when improvement in flavor stability is desired.

*Example 6.*—The foregoing steps of Example 5 can be carried out either in a continuous manner, employing equipment similar to that indicated in Figure 1, or they can be carried out semi-continuously, employing equipment similar to that indicated in Figure 4. When operated semi-continuously the blending of dried glycerides to be directedly rearranged may be accomplished batchwise in vessels 303a and 303b, each of which is provided with suitable valved inlet and outlet lines, mechanical agitators, and heating and cooling coils, and these same vessels may be employed for the catalyst activation step (the catalyst being introduced either manually or by any suitable feeding means), and also, if desired, for pre-randomization of the glyceride mixture. Glyceride-catalyst dispersion is drawn alternately from vessels 303a and 303b and passed continuously through scraped-wall freezer 314 into one of a battery of independent batch crystallizers 317a, b, and c. When this crystallizer has been filled with chilled crystal-cloudy glycerides the freezer discharge is switched to the next empty crystallizer, and directed interesterification is continued to the desired end point in the first crystallizer, whereupon water or other catalyst deactivating agent is added, the batch is heated to melt the trisaturate crystals (and to coagulate the soap foots, unless this is to be accomplished in a later vessel, or dispensed with), and is then withdrawn for foots removal.

An essential feature of this semi-continuous process, as also of our preferred continuous process, is an initial supercooling followed by the formation of a cloud of extremely fine fat crystals. Our experience indicates that in order to attain the most satisfactory and rapid operation the initial crystal formation which occurs during the chilling step is preferably accompanied by extensive scraping of crystals from the cooling surface. This may be expressed in terms of the number of scrapes per square foot of cooling surface per cubic foot of glyceride mixture during passage of the latter through the freezer. Thus when glyceride is passed at a volumetric rate of 0.15 cubic foot per minute (V) through a freezer having 1.5 square feet of cooling surface (A), equipped with a four-blade scraper revolving 300 R. P. M., thus providing 1200 scrapes of the entire surface per minute (F), the potential extent of crystal scraping is 1.5×1200/0.15, or 12,000 square feet scrapes per cubic foot of glycerides passed through the freezer. If, however, the first ⅓ of the freezer is employed in cooling the fully melted glycerides down to the point of initial cloud formation and only ⅔ (C) is engaged in crystal formation, then the actual extent of crystal scraping (S) is ⅔ of 12,000, or 8000 square foot scrapes per cubic foot. In general terms, $S = C \times A \times F/V$. For a desirably rapid process (whether continuous or semi-continuous), from the practical standpoint of economical factory operation, we prefer an S value of the order of 3000 or higher.

*Example 7.*—In this example good grade commercial bulk lard is employed, after flash drying as in Example 1. In this case the dried lard, with 0.2% of sodium dispersed in toluene added and agitated for 15 minutes, is continuously chilled to 85° F. in a Ross tubular heat exchanger which is not equipped with a scraper or agitator, but which is designed for rapid linear rates of flow of the glycerides and for high coefficients of heat transfer.

With rapid chilling equipment of this character the cooling water should not be much below 75° F., and the glyceride outlet temperature from the cooler should not be much below 80° F., with most lards encountered commercially, lest crystal formation on the cooling surfaces interfere with the operation.

Upon leaving the tubular heat exchanger the stream of chilled glycerides is passed through a crystallizer provided with a relatively slow speed transverse agitator, and provided also with a jacket through which water at 80° F. is passed to restrain the temperature rise which tends to occur in this stage of the process. After 78 minutes' time of passage in this crystallizer the directedly rearranged lard emerges at a temperature of 89° F.

The resulting directedly rearranged lard, after plasticizing by chilling and picking, and tempering at about 85° F., has a good plastic consistency (between 165 and 217 penetration units by A. S. T. M. method D217–52T) over a 24° F. range of temperatures (from 71° F. to 95° F.) and is an excellent shortening.

*Example 8.*—Melted prime steam lard is heated to 330° F. in a continuous manner at a rate of 100 parts by weight per hour, the flowing stream is dried in a two-stage vacuum drier to below 0.01% moisture content, cooled to 110° F., 0.24 part by weight per hour of sodium-potassium catalyst are introduced and dispersed throughout the stream, 15 minutes' time is allowed for catalyst activation and initial undirected interesterification, hydrogen gas is removed, the lard-catalyst dispersion is chilled to 70° F. in a continuous freezer, the chilled slurry is retained under mild agitation (in this case 40 R. P. M.) during a 90 minute dwell time in a continuous crystallizer from which it emerges at 87.5° F., 2.3 parts by weight per hour of water is introduced with agitation into the stream leaving the crystallizer, the mixture is heated to 160° F., the refining foots which float to the top (due to entrained gas) are removed, the refined glycerides are filtered, and are then hydrogenated from 72 I. V. to 66 I. V., 4.5% of a mono- and di-glyceride mixture is then incorporated, and the glyceride mixture is deodorized, plasticized, packed, and tempered.

The cloud point of the crude lard is about 17° C. and that of the directedly rearranged material, before hydrogenation is about 31° C. The plasticized finished product has a wide plastic range (165 A. S. T. M. penetration units at 66° F. and 217 units at 91° F.) and has excellent behavior characteristics when used as a shortening.

*Examples 9, 10, 11, 12.*—In these examples several different vegetable oils are directedly interesterified in equipment corresponding generally to that illustrated in Figure 2. In each case the catalyst is 0.24% of a 50–50 liquid mixture of sodium and potassium, and it is permitted an activation time of 15 minutes.

The principal operating conditions and pertinent product characteristics are shown in the accompanying table. The directedly rearranged products of Examples 9 and 10 are, as a result of an increase in their trisaturate contents brought about by the process, greatly increased in firmness, and have had imparted to them an usually uniform plastic consistency over a wide range of temperatures as is indicated by the exceedingly slight changes in their S. C. I. values when warmed from 70° F. to 92° F.

The product of Example 12 is also firmed to some degree by this processing and is improved in stability of plastic consistency. In Example 11 so low a freezer outlet temperature is employed that disaturated monounsaturated glycerides crystallize in large amounts, and the product characteristics indicate that this type of triglyceride is present in unusually high proportion in the product of this example. This indication arises from the fact that although the directed rearrangement caused a marked increase in S. C. I. at moderate to warm temperatures (an S. C. I. increase of 7.3 units when measured at 70° F., and 6.1 units when measured at 92° F.) the solids which caused this increase for the most part melted or redissolved at 100° F. as shown by the low S. C. I. value (2.8) at that temperature. Trisaturates do not melt at 100° F. and dissolve only sparingly in liquid phase at that temperature.

The changes thus made in the initial glycerides of these examples are useful in the compounding or blending of glyceride mixtures for use in the manufacture of shortenings and margarines.

|  | Example 9 | Example 10 | Example 11 | Example 12 |
|---|---|---|---|---|
| Glyceride fat employed | Refined and bleached palm oil | Cottonseed oil stearine (from winter oil manufacture) | Soybean oil hydrogenated to 87 I. V. | Refined and bleached coconut oil |
| Outlet temperature: | | | | |
| from 1st freezer °F | 82 | 70 | 41 | 71 |
| from 2nd freezer °F | 76 | 70 | 37 | 74 |
| from principal crystallizer °F | 94 | ¹ 89 | 83 | 80 |
| Time of passage: | | | | |
| through preliminary crystallizer min | 2 | 2 | 2 | 2 |
| through principal crystallizer min | 90 | ¹ 90 | 90 | 90 |
| Total temperature increase in both crystallizers °F | 25 | 27 | 66 | 12 |
| Cloud points: | | | | |
| Initial °C | 22.3 | 9.3 | 14.2 | 14.4 |
| Final °C | 34.9 | 29.0 | 24.2 | 15.9 |
| S. C. I. at 70° F.: | | | | |
| Initial | 13.2 | 1.3 | 5.2 | 30.2 |
| Final | 37.3 | 20.0 | 12.5 | 31.8 |
| S. C. I. at 80° F.: | | | | |
| Initial | | | | 0 |
| Final | | | | 12.7 |
| S. C. I. at 92° F.: | | | | |
| Initial | 6.6 | 0.1 | 0.6 | 0 |
| Final | 36.9 | ¹ 18.8 | 6.7 | 0 |
| S. C. I. at 100° F.: Final | 35.2 | 16.9 | 2.8 | |

¹ When the time of passage through the principal crystallizer in this Example 10 is prolonged to 150 minutes the outlet temperature is 93° F., and the resulting product has a cloud point of 30.7° C. and an S. C. I. at 92° F. of 23.0.

The processing details in the practice of our invention may be varied widely without departing from its scope. The following discussion applies to some of the general considerations relating to our process and is intended to supplement the observations made in connection with the preceding specific examples.

Pre-drying

The catalysts employed in low temperature directed interesterification have as a general rule the property of absorbing and/or reacting with moisture, and for this reason the moisture content of the triglyceride mixtures to be treated by our process is not critical provided that enough catalyst is used to allow an effective amount to be left over after the moisture present in the fat has been absorbed or reacted. For practical reasons, however, it is more economical to remove the moisture by means of heat and reduced pressure before the catalyst is added, and we find it desirable to pre-dry the fat to a moisture content below 0.01%. This may readily be accomplished by flash drying under reduced pressure, or in any other convenient manner.

Catalysts

Any of the catalysts referred to in the patents to Eckey, 2,442,531 and 2,558,547, are suitable for use in our process. In order to economize on size of the equipment and the expense of operation, we prefer to employ the more active catalysts such as the alkali metals. As has already been mentioned in connection with Example 1, the exact nature and composition of the true active interesterification catalyst is not known in all cases, and the fact that an induction period is frequently observed before the reaction starts leads to the assumption that catalytic materials added to the fat are in some cases not themselves the true catalysts. The term "catalyst," however, is used in the present application to include both the catalytic materials added to the fat (e. g. alkali metal, alkali metal alkoxide, etc.), and also whatever true catalyst is formed as a reaction product in the fat undergoing treatment.

Preactivation of catalyst

We find it convenient to allow time for the catalyst induction period, or catalyst activation, within the main body of the fat to be interesterified, but in some instances, particularly to make optimum use of equipment time, it may be desirable to preactivate the catalyst in a relatively small portion of the glycerides to be interesterified, and add the oil suspension of preactivated catalyst to the main body of fat to be processed. Whenever the finished product is to be made from a mixture of fats and oils from different sources, it may be convenient to use one of the minor components of the final mixture as the material in which the catalyst is preactivated; thus in making a superglycerinated product diglycerides may be employed in the catalyst preactivation step.

Prerandomizing

In some of the foregoing examples, the triglyceride mixture is subjected to interesterification while wholly in liquid condition, prior to the chilling which initiates the low temperature directed rearrangement. This has certain slight advantages in that the catalyst activation proceeds more rapidly at temperatures above or about the complete melting point of the fat than at the considerably lower freezer outlet temperatures, and in that with some triglyceride mixtures such as natural lard the step of random rearrangement increases the trisaturate content of the mixture and thus provides a greater quantity of trisaturated crystals at the outset of the directed rearrangement step. It is, of course, quite unnecessary to continue the "undirected" interesterification (if it is practiced at all) until the attainment of random equilibrium.

Initial rapid chilling

An important feature of our process is that a flowing stream of the glyceride mixture to be directedly interesterified is rapidly chilled, preferably in the presence of activated interesterification catalyst, at least as low as the temperature at which the lower melting point modifications (the beta prime and/or alpha) of crystals of trisaturates form within the mixture. During the early stages of this quick chilling the mixture is supercooled with respect to at least some of its trisaturate components with the result that when crystallization begins a cloud of exceedingly fine crystals quickly or suddenly forms. This is important because it provides a vast number of nucleating points which facilitate the formation of crystals of newly formed trisaturates during the next stage of the process, thus helping to relieve one of the "bottlenecks" inherent in the directed rearrangement process as formerly practiced. For a desirable amount of supercooling we prefer to extract heat during the chilling step at a rate corresponding to cooling the liquid glycerides at least about 15° to 20° F. per minute. A low final temperature at the end of the rapid chilling step favors prompt crystallization of newly formed trisaturates, and this in turn tends to maintain a strong mass action driving force for further interesterification.

In practicing our process with lard, the initial chilling is preferably carried to about 70° to 75° F., but we have conducted the process with initial chilling as low as 60° F. (with single cycle operation) and as high as 84° F. (with two-cycle operation), the operative limits being broader than these values and varying somewhat with the composition and characteristics of the particular lard or lard blend being treated. When lard is quickly chilled to temperatures within these ranges some disaturated monounsaturated glycerides frequently crystallize along with trisaturates. This is particularly noticeable when there has been no prerandomizing of the lard. These disaturated crystals do not, however, interfere with the process, and they melt or redissolve during the temperature rise which subsequently takes place. Their melting tends to moderate the extent to which the temperature would otherwise rise.

Low temperature directed rearrangement

Strongly directed rearrangement commences, in the presence of active catalyst, when a cloud of fine crystals forms upon cooling the glyceride mixture. The brief time required for each portion of the mixture to pass through the freezer (less than a minute, with conventional equipment) is however insufficient for much progress to be made in the reaction until after the initial chilling. Given an adequate dispersion of fine crystals, and fairly vigorous crystal facilitating agitation, the directed interesterification then proceeds rapidly for a time. By "crystal facilitating agitation" we have in mind a greater effective energy input for agitation than that supplied in agitation by tumbling, in order to facilitate the prompt contacting of existing crystals with newly supersaturated portions of the liquid so as to relieve the supersaturation quickly and permit the mass action driving force of the interesterification to remain strong.

The general nature of the directed rearrangement reaction has been described in connection with Example 1. It slows down as the supply of saturated fatty acid radicals in the liquid phase lessens, and as the viscosity of the mass increases. When treating lard- or tallow-containing mixtures for shortening we prefer to end the rearrangement when from one fourth to one half of the saturated radicals are combined as trisaturates.

As previously mentioned, there is normally a rising temperature gradient during this stage of our process. In many cases no positive temperature control is necessary, once the directed rearrangement has been suitably initiated. In other cases it may be desirable either to absorb some or all of the heat liberated by the crystal formation (see Example 7), or, on the other hand, to provide additional heat. Thus when an increase in the disaturated-monounsaturated triglyceride content of a fatty mixture is desired the initial rapid chilling must be sufficient to cause precipitation of this type of glycerides ($S_2U$), and any subsequent temperature rise should be limited sufficiently to avoid the melting or redissolving of $S_2U$ crystals. On the other hand, when it is desired to decrease the $S_2U$ content of a fatty mixture, and increase its content of trisaturates ($S_3$), any initial crystallization of $S_2U$ should be followed, during the directed rearrangement stage of the process, by a subsequent temperature rise sufficient to remelt or redissolve at least most of such $S_2U$ crystals. Needless to say, in no event should the temperature during this stage of the process be raised so high as to melt or redissolve any major proportion of crystals of the triglyceride type intended to be increased in the mixture.

With lard we have usually reached our preferred end points after a total of about 50 to 100 minutes of directed interesterification, and at a final temperature within the range from about 80° F. to about 95° F. During the final stages greater efficiency is realized if end-for-end mixing of the moving stream is minimized. This may be accomplished, while providing the constant agitation that is needed, by placing occasional cross baffles having restricted openings, in the path of the moving stream. Figures 2 to 8 of U. S. Patent 2,520,424 illustrate equipment thus designed.

End point control

The most accurate convenient measure of the extent to which the directed rearrangement reaction (really a series of reversible reactions, accompanied by precipitation of one species of reaction product) has progressed is the solids content index, or S. C. I., which for any given temperature at which a fat sample is tested tells approximately the percent by weight of solid phase that is present. This is found to be a vital factor in the plastic behavior of shortenings. This test, which has been referred to just before the specific examples, requires an hour or two to perform and hence is not suitable for quick control purposes.

For actual process control we prefer to employ the previously described "cloud point" test, and when processing a given type of fat, such as prime steam lard, day after day, we find it helpful to prepare a correlation chart for converting cloud points to corresponding S. C. I.'s. In preparing batches of intermediate product (directedly rearranged) ready for deodorizing, plasticizing, and packing, one may resort to blending in order to achieve the exact S. C. I. that is desired.

The selection of a suitable end point for the directed rearrangement depends upon the particular triglyceride mixture being processed, the succeeding steps to be taken (e. g. hydrogenation and/or blending in either liquid oil or hard stock), and the plastic behavior desired in the final product. For lard shortening we have found that an A. S. T. M. penetration value of 180 at 70° F. corresponds to an S. C. I. value at 70° F. of about 20 to 22.

Catalyst deactivation and removal

When the catalyst employed is an alkali metal or an alkali metal alkoxide the catalyst deactivation is conveniently accomplished by adding to the glyceride-catalyst mixture about ten parts of water for every part of catalyst initially introduced. This results in the formation of an aqueous solution of caustic alkali, and it is therefore desirable to proceed with the removal of this alkali as rapidly as possible before it saponifies any great amount of neutral triglycerides. (Free fatty acids initially present are of course converted to alkali soaps quite early in the process.) In order to minimize saponification of neutral fat one may employ an aqueous solution or slurry of an acid or an acid salt, e. g. phosphoric acid, or monosodium orthophosphate, as the catalyst deactivating agent.

Having thus described our invention, what we claim and desire to secure by Letters Patent is:

1. The improvement in processes of low temperature directed interesterification of mixtures of triglycerides which differ in their melting points, which comprises: (1) rapidly chilling successive portions of a flowing stream of said mixture to a temperature below that at which a cloud of fine crystals forms in the mixture but not as low as the freezing point of the lowest melting component triglycerides, the rate of said chilling being so great as to cause supercooling and the sudden formation of a cloud of extremely minute crystals of higher melting triglycerides throughout the flowing stream, the accumulation of crystals upon the surface of the heat extracting means being prevented; (2) effecting directed rearrangement in a mass of said rapidly chilled triglyceride mixture in the presence of a uniform fine dispersion of an effective amount of an active low temperature interesterification catalyst and with continuous mechanical agitation adapted to keep the mass liquid and effect relative movement of all parts thereof, thereby facilitating continued crystallization of higher melting triglycerides formed by the continuing interesterification; (3) interrupting said directed interesterification, by inactivating the catalyst therein while the temperature of the mass is still at least 3° F. below the maximum to which it would rise if the directed rearrangement were continued under adiabatic conditions.

2. The improvement in processes of low temperature directed interesterification of mixtures of triglycerides which differ in their melting points, which comprises: (1) rapidly chilling successive portions of a flowing stream of said mixture to a temperature below that at which a cloud of crystals forms in the mixture but not as low as the freezing point of the lowest melting component triglycerides, the rate of said chilling being so great as to cause supercooling thereby resulting in the formation of a cloud of extremely minute crystals of triglycerides throughout the flowing stream; (2) effecting directed rearrangement in a mass of said rapidly chilled triglyceride mixture in the presence of a uniform fine dispersion of an effective amount of an active low temperature interesterification catalyst and in the presence of continuous mechanical agitation adapted to keep the mass liquid and effect relative movement of all parts thereof, thereby facilitating continued crystallization of trisaturated triglycerides formed by the continuing interesterification, the temperature of the mass being gradually elevated during said directed rearrangement thereby dissolving such disaturated monounsaturated triglycerides as may have crystallized during earlier stages of the process; (3) interrupting said directed interesterification, by inactivating the catalyst therein, after the temperature has reached the point at which disaturated monounsaturated triglycerides are substantially all in solution but before that temperature has been reached at which further directed interesterification ceases.

3. Process of claim 1 in which there are employed a plurality of cycles of rapid chilling followed by directed rearrangement.

4. Process of claim 1 in which a portion of the stream after partial directed rearrangement is recycled through the initial main stream rapid chilling step.

5. The process of claim 1, in which the catalyst is preactivated in a minor proportion of glycerides prior to its introduction into the flowing stream of glycerides to be directedly rearranged.

6. The process of claim 1, in which unactivated catalyst is introduced into the flowing stream of glycerides to be directedly rearranged prior to the completion of the rapid chilling step, and in which catalyst activation occurs within said stream.

7. The process of claim 1, in which the mixture of glycerides includes major proportions of glycerides of tallow and of at least one member of the group of temperate zone seed oils consisting of cottonseed oil, soybean oil, peanut oil, corn oil, sunflower seed oil, linseed oil, and their partial hydrogenation products.

8. The process of claim 1 in which the continuous rapid chilling is accompanied by scraping of the cooling surface at a rate of at least 3000 square foot scrapes per cubic foot of glycerides chilled.

9. In the process of low temperature directed interesterification of a mixture of glycerides which differ in their melting points, in the presence of an active low temperature interesterification catalyst, wherein the said mixture is rapidly chilled to produce crystals of relatively higher melting glycerides, and directed interesterification of the chilled mass is effected while energetically agitating the mass, and wherein the catalyst is inactivated while solid fat crystals formed by the directed interesterification are still present and before the directed interesterification has progressed to equilibrium, the improvement which comprises the following steps: (1) applying the rapid chilling to a flowing, vigorously agitated stream of a mixture of glycerides, which includes mixed glycerides derived from natural fats containing both saturated and unsaturated fatty acid radicals to form a heavy cloud of exceedingly minute fat crystals, the time of chilling being no more than about one minute and the extent of chilling being such as to give the mixture a sufficient heat absorbing capacity to absorb the net heat of crystallization liberated in step 2 of the process while the mixture still remains at a temperature below the maximum to which it would rise if the directed interesterification were continued under adiabatic conditions, and (2) effecting directed interesterification within the cooled mass after discontinuing the extraction of heat therefrom, this interesterification effecting an increase in trisaturated glyceride content of the mass and being accompanied by the melting of disaturated monounsaturated glyceride crystallized during step 1.

References Cited in the file of this patent

UNITED STATES PATENTS

| | | |
|---|---|---|
| 2,442,531 | Eckey | June 1, 1948 |
| 2,442,532 | Eckey | June 1, 1948 |
| 2,442,533 | Eckey | June 1, 1948 |

UNITED STATES PATENT OFFICE
CERTIFICATE OF CORRECTION

February 24, 1959

Patent No. 2,875,066

George W. Holman et al.

It is hereby certified that error appears in the printed specification of the above numbered patent requiring correction and that the said Letters Patent should read as corrected below.

Column 8, line 72, for "usually" read -- unusually --.

Signed and sealed this 30th day of June 1959.

(SEAL)
Attest:

KARL H. AXLINE
Attesting Officer

ROBERT C. WATSON
Commissioner of Patents